(12) United States Patent
Meyer et al.

(10) Patent No.: US 9,215,878 B2
(45) Date of Patent: Dec. 22, 2015

(54) PRODUCTION OF ARTICLES WITH VARYING CONTENT OF ADDITIVES

(75) Inventors: Markus Meyer, Egnach (CH); Richard Schär, Wittenbach (CH); Christian Gutmann, Zuzwil (CH)

(73) Assignee: Buhler AG, Uzwil (CH)

( * ) Notice: Subject to any disclaimer, the term of this patent is extended or adjusted under 35 U.S.C. 154(b) by 373 days.

(21) Appl. No.: 13/445,291

(22) Filed: Apr. 12, 2012

(65) Prior Publication Data

US 2012/0213897 A1 Aug. 23, 2012

Related U.S. Application Data

(62) Division of application No. 12/282,158, filed as application No. PCT/CH2007/000114 on Mar. 5, 2007, now abandoned.

(30) Foreign Application Priority Data

Mar. 9, 2006 (DE) .......................... 10 2006 011 362

(51) Int. Cl.
*A23L 1/03* (2006.01)
*B29C 47/00* (2006.01)
(Continued)

(52) U.S. Cl.
CPC ............... *A21C 1/065* (2013.01); *A21C 1/1425* (2013.01); *A21C 11/16* (2013.01); *B01F 15/0404* (2013.01); *B01F 15/0416* (2013.01);
(Continued)

(58) Field of Classification Search
CPC .......... A21C 1/006; A21C 1/06; A21C 1/065; A21C 1/10; A21C 1/105; A21C 1/14; A21C 1/142; A21C 1/1425; A21C 1/1435; A21C 1/145; A21C 1/1455; A21C 1/146; A21C 11/16; A21C 11/20; B01F 15/0404; B01F 15/0416; B28C 5/1292; B28C 7/0413; B28C 7/0418; B29C 31/10; B29C 47/0009; B29C 47/1081; B29C 47/1063; B29C 47/385; B29C 47/92; B29C 2947/92866; B29C 2947/92514; B29C 2947/926; B29C 2947/92704; B29C 2947/92895
USPC .............. 264/75, 176.1, 211, 211.12, 211.15, 264/211.18; 426/231, 249, 446, 448, 504, 426/506, 512, 516, 519, 661, 808; 425/155, 425/145, 131.1, 209
See application file for complete search history.

(56) References Cited

U.S. PATENT DOCUMENTS

3,445,239 A * 5/1969 Viault, Jr. ...................... 426/458
3,618,162 A 11/1971 Scharer et al.
(Continued)

*Primary Examiner* — Seyed Masoud Malekzadeh
(74) *Attorney, Agent, or Firm* — Heslin Rothenberg Farley & Mesiti P.C.

(57) ABSTRACT

The invention relates to a method and device for continuous production of articles including at least two different types from a pasty mass. The mass is introduced into a processor unit by a supply unit, processed in the processor unit and transported further thereby, whereupon an adjunct is added by a metering unit to the mass transported through the processor unit. The mixing of the adjunct introduced to the mass is carried out by a mixing unit with mixing elements located downstream of the processor unit. The mass with provided adjunct is formed by a forming unit into individual articles downstream of the mixing unit. According to the invention, the metering of the adjunct is carried out in a sequence of metering conditions with at least two different metering conditions, wherein the metering unit, for a given metering condition, introduces the adjunct to the mass at a given metering rate.

28 Claims, 3 Drawing Sheets

(51) Int. Cl.
   *A21C 1/06* (2006.01)
   *A21C 11/16* (2006.01)
   *B01F 15/04* (2006.01)
   *B28C 5/12* (2006.01)
   *B28C 7/04* (2006.01)
   *B29C 47/10* (2006.01)
   *B29C 47/92* (2006.01)
   *B29C 47/38* (2006.01)
   *A21C 1/14* (2006.01)
   *A21C 11/20* (2006.01)
   *B29C 31/10* (2006.01)
   *B29K 105/00* (2006.01)

(52) U.S. Cl.
   CPC ............ *B28C5/1292* (2013.01); *B28C 7/0413* (2013.01); *B28C 7/0418* (2013.01); *B29C 47/1063* (2013.01); *B29C 47/385* (2013.01); *B29C 47/92* (2013.01); *A21C 1/06* (2013.01); *A21C 1/14* (2013.01); *A21C 1/145* (2013.01); *A21C 11/20* (2013.01); *B29C 31/10* (2013.01); *B29C 47/0009* (2013.01); *B29C 47/1081* (2013.01); *B29C 2947/926* (2013.01); *B29C 2947/92514* (2013.01); *B29C 2947/92704* (2013.01); *B29C 2947/92866* (2013.01); *B29C 2947/92895* (2013.01); *B29K 2105/0005* (2013.01)

(56) References Cited

U.S. PATENT DOCUMENTS

| | | | | |
|---|---|---|---|---|
| 4,311,397 A * | 1/1982 | Wright | ............................. | 366/98 |
| 4,339,468 A * | 7/1982 | Kielsmeier | ................... | 426/582 |
| 4,630,930 A * | 12/1986 | Seiling | ............................ | 366/77 |
| 5,015,488 A * | 5/1991 | Van Lengerich et al. | ..... | 426/549 |
| 5,059,439 A * | 10/1991 | Wenger et al. | ................. | 426/451 |
| 5,071,668 A * | 12/1991 | Van Lengerich et al. | ..... | 426/549 |
| 5,128,166 A | 7/1992 | Babines et al. | | |
| 5,158,725 A | 10/1992 | Handa et al. | | |
| 5,186,539 A | 2/1993 | Manser et al. | | |
| 5,347,468 A * | 9/1994 | Rupp et al. | ..................... | 700/284 |
| 5,417,992 A | 5/1995 | Rizvi et al. | | |
| 5,573,720 A | 11/1996 | Kotzer | | |
| 5,591,472 A * | 1/1997 | Cummins | ..................... | 426/503 |
| 5,714,187 A * | 2/1998 | Froidevaux et al. | ........... | 426/231 |
| 5,723,517 A | 3/1998 | Campo et al. | | |
| 5,776,534 A | 7/1998 | Christensen et al. | | |
| 5,935,514 A | 8/1999 | Ford, Jr. et al. | | |
| 6,386,748 B1 | 5/2002 | Huber et al. | | |
| 6,415,708 B2 * | 7/2002 | Huber et al. | ..................... | 99/348 |
| 6,531,077 B1 | 3/2003 | Flarup-Knudsen | | |
| 6,572,253 B2 | 6/2003 | Silvi et al. | | |
| 6,863,429 B2 * | 3/2005 | Torghele et al. | ........... | 366/76.92 |
| 6,915,734 B2 * | 7/2005 | Torghele et al. | ................. | 99/348 |
| 7,320,583 B2 * | 1/2008 | Bortone et al. | ................. | 425/155 |
| 7,514,112 B2 * | 4/2009 | Fisson et al. | ................... | 426/312 |
| 7,938,060 B2 * | 5/2011 | Manak et al. | ..................... | 99/361 |
| 2002/0102338 A1 | 8/2002 | Knudsen | | |
| 2002/0137838 A1 * | 9/2002 | Silvi et al. | ..................... | 524/588 |
| 2002/0176921 A1 * | 11/2002 | Torghele et al. | ............... | 426/549 |
| 2004/0037941 A1 | 2/2004 | Knudsen | | |
| 2004/0206246 A1 | 10/2004 | Bortone et al. | | |
| 2005/0123659 A1 * | 6/2005 | Torghele et al. | ............... | 426/289 |
| 2005/0133951 A1 | 6/2005 | Muller et al. | | |
| 2006/0053650 A1 * | 3/2006 | Manak et al. | ..................... | 34/60 |
| 2008/0160157 A1 * | 7/2008 | Rutishauser et al. | ......... | 426/601 |

\* cited by examiner

PRODUCTION OF ARTICLES WITH VARYING CONTENT OF ADDITIVES

CROSS REFERENCE TO RELATED APPLICATIONS

This application is a divisional of U.S. application Ser. No. 12/282,158 filed Oct. 7, 2008 which now is abandoned and is a national phase filing under 35 U.S.C. §371 of PCT International Application PCT/CH2007/000114, filed Mar. 5, 2007, and published under PCT Article 21(2) in German as WO 2007/101359 A2 on Sep. 13, 2007. PCT/CH2007/000114 claimed priority from German application No. 10 2006 011 362.4, filed Mar. 9, 2006. The entire contents of each of the prior applications are incorporated herein by reference.

The invention relates to a device and a method for continuously producing a multiplicity of articles comprising at least two different types of articles from a pasty mass.

Devices of this type usually have a processing unit with transporting elements for processing and transporting the mass, a feeding unit for feeding the mass into the processing unit, a metering unit for metering an additive into the mass transported through the processing unit, a mixing unit with mixing elements downstream of the processing unit for mixing the metered-in additive into the mass and also a molding unit with molding elements downstream of the mixing unit for molding the mass provided with an additive into individual articles.

The articles may be, for example, small handy articles for daily use or comestibles which consist of any desired material that can be processed in a pasty or doughy state and can be molded into individual items/articles and finally made to set.

Depending on the type and or amount of the additive metered in, for example a colorant or flavoring, a multiplicity of articles that differ from one another as a result of the different metering to them are obtained.

Specifically in the case of small mass-produced articles for daily use, it is often desirable to package a multiplicity of such articles for daily use, for example articles that are differently colored, in a multipack in order to increase their attractiveness to a potential buyer.

The same situation applies to comestibles. These usually consist of a digestible basic material, which generally comprises starch and/or protein, and is colored and/or flavored. Here, too, it is often desirable to package a multiplicity of such articles for daily use, for example articles that differently colored and suggest a specific flavor, in a multipack in order to increase their attractiveness to a potential buyer.

In order to produce such mixed packs of loose articles for daily use or comestibles, generally different types of the articles concerned are produced separately and subsequently mixed with one another.

This mixing operation may be quite complex and even lead to damage (breakage, abrasion) of the individual articles during the mixing, so that not only damaged articles but also relatively coarse and fine fragments or abraded particles of the individual articles may be found in the mixed packs.

The invention is therefore based on the object of eliminating, or at least reducing, the disadvantages occurring with the mixing operation in the production of the mixed pack mentioned at the beginning.

This object is achieved by the device as claimed for continuously producing a multiplicity of articles comprising at least two different types of articles from a pasty mass.

The device according to the invention has a processing unit with transporting elements for processing and transporting the mass, a feeding unit for feeding the mass into the processing unit, a metering unit for metering an additive into the mass transported through the processing unit, a mixing unit with mixing elements downstream of the processing unit for mixing the metered-in additive into the mass and also a molding unit with molding elements downstream of the mixing unit for molding the mass provided with an additive into individual articles.

According to the invention, the metering unit is connected by means of at least one switching unit to at least one source of a respective additive, and a respective switching unit can be switched into a respective switching state in which the metering unit can meter the respective additive into the mass at a respective metering rate (metered mass of additive per second).

In the case of the method according to the invention, the following operations are performed: feeding of the mass by means of a feeding unit into a processing unit, transporting and processing of the mass through the processing unit, metering of an additive by means of a metering unit into the mass transported through the processing unit, mixing of the metered-in additive into the mass by means of a mixing unit with mixing elements downstream of the processing unit and also molding of the mass provided with the additive into individual articles by means of a molding unit with molding elements downstream of the mixing unit.

According to the invention, the metering in of the additive takes place in a sequence of metering states comprising at least two different metering states, the metering unit in a respective metering state metering the additive into the mass at a respective metering rate (metered mass of additive per second).

The relatively late mixing in of one or more additives by means of a mixing unit with mixing elements downstream of the processing unit, in which the actual processing of the mass is performed, and the metering in of the additive in a sequence of metering states comprising at least two different metering states achieve the effect that, at the end of the method according to the invention, at least two different types of an article are continuously produced in an alternating sequence. This has the consequence that the different articles produced in this way are supplied to a further treatment unit downstream of the molding unit in an already premixed form.

During a subsequent mixing operation, taking place for example in a downstream treatment unit, much less mixing effort is therefore necessary to achieve uniform mixing up of the at least two types of articles.

These are therefore subjected to far less stress in such a mixing operation and suffer virtually no damage. Furthermore, much less breakage and abrasion occurs. In this way, defined amounts of well mixed-up and nevertheless largely undamaged articles can be packaged in attractive mixed packs. Such mixed packs are either completely transparent or have a viewing window.

On the other hand, however, the at least two types of articles produced continuously in alternating sequence may also be left unchanged in their arrangement in the subsequent treatment and, without changing the sequence, be filled directly into a mixed pack. In this way, defined amounts of articles that are arranged in a specific pattern and virtually undamaged can be packaged in the said mixed packs.

The device according to the invention may be a device for the continuous production of articles for daily use from a set polymer material (polyester, polyamide, polycarbonate, etc.), in which the processing unit with the transporting elements is a compounding unit for polymer materials.

Alternatively, it may be a device for the continuous production of articles for daily use from a set ceramic material, in which the processing unit with transporting elements is a compounding unit for ceramic materials.

Here, too, the advantages described further above can be fully utilized.

A device according to the invention may also be a device for the continuous production of comestibles from a moistened mass of raw material containing starch and/or protein. In this case, the processing unit with transporting elements is an extrusion-cooking unit for materials containing starch and/or protein or a cold-extrusion unit for materials containing starch and/or protein.

Here especially, the procedure according to the invention proves to be particularly advantageous, since extrusion-cooked or cold-extruded products are generally brittle or crumbly after they have been made to set.

In the case of the device according to the invention, the metering unit is preferably connected by means of a switching unit to at least one source of an additive, the switching unit being able to be switched into a first switching state, in which the metering unit can meter the additive into the mass with a first metered amount, and into a second switching state, in which the metering unit can meter the additive into the mass with a second metered amount. As a result, deliberate sequences of alternating articles can be produced.

In the case of the device according to the invention, the metering unit is preferably connected by means of the switching unit to a first source for a first additive and to a second source for a second additive, the switching unit being able to be switched into a first switching state, in which the metering unit can meter into the mass a first metered-amount mixing ratio of the first additive and the second additive, and into a second switching state, in which the metering unit can meter into the mass a second metered-amount mixing ratio of the first additive and the second additive. As a result, special mixing/metering actions, and consequently quite individual product properties, can be set. In the case of an advantageous embodiment, the switching unit can be switched into a third switching state, in which the metering unit can meter into the mass a third metered-amount mixing ratio of the first additive and the second additive.

In particular, it may be the case here that, in a first switching state, only a first type of additive can be metered in with a first metered amount and, in a second switching state, only a second type of additive can be metered in with a second metered amount, it preferably being the case that, in a third switching state, a first type of additive and a second type of additive can be simultaneously metered in with the first metered amount and with the second metered amount, respectively.

The processing unit with transporting elements may be an extruder, that is a single-screw extruder or a multi-screw extruder.

Preferably used as the mixing unit is a mixing kneader, which has transporting elements at least in subregions along the transporting direction of its mixing chamber. Particularly preferred for this is a multi-screw extruder, in particular a twin-screw extruder, with which good mixing in of the additive can be achieved even over short mixing lengths.

The mixing unit expediently has along an axial transporting direction a subregion with kneading elements, in particular with polygonal blocks or knurls. The mixing unit preferably has along an axial transporting direction a subregion with transporting elements, in particular with screw elements. The mixing unit may have not only forwardly transporting screw elements but also rearwardly transporting screw elements. This makes it possible that not only a mixing in of additives is made possible within the mixing unit but also at the same time a sealing of the further downstream portions of the device with respect to the processing pressure in the processing unit is achieved.

The molding unit is preferably arranged directly downstream of the mixing unit, in order to ensure the smallest possible residence time range of the metered additives in the molding unit. A cyclic metering in of additives (for example colorants) then leads to sharp transitions between the alternating sequences of different (for example differently colored) articles after the molding unit.

The processing chamber of the molding unit and the transition from the processing chamber of the mixing unit to the molding unit are preferably formed without any dead volume. As a result, entrainments of additives in the mass are likewise prevented, which likewise contributes to said sharp transitions between the alternating sequences of different articles after the molding unit. The processing chamber of the molding unit and the transition preferably have no movable machine elements. This also has the result that entrainments of additives in the mass are prevented, helping to create said sharp transitions between the alternating sequences of different articles after the molding unit. In particular, the inside wall of the processing chamber of the molding unit and of the transition must not have any edges. This means in actual fact that the inside wall of the processing chamber of the molding unit and of the transition should have a radius of curvature of at least 2 mm, preferably of at least 4 mm, in all regions.

It is also advantageous if the processing chamber of the molding unit and the transition from the processing chamber of the mixing unit to the molding unit have nozzles for metering in a fluid. This allows liquids, such as for example oil, water, certain emulsions, solutions or wax, to be metered in, bringing about a reduction in the wall friction in the molding unit and consequently a flushing effect. This also contributes to a sharper transition between the alternating sequences of different articles. The metering in of the fluid is preferably performed in a pulsed manner.

The inside wall of the processing chamber of the molding unit and of the transition may be lined with a nonstick coating, which consists in particular of a polymer material comprising F atoms or Si atoms.

In the case of a particularly advantageous embodiment, the metering unit is connected to the mixing unit, the metering unit preferably being connected in an axial subregion of the mixing unit that lies in or upstream of the axial subregion with the kneading elements. It is particularly advantageous if the metering unit is connected in an axial subregion of the mixing unit that lies directly upstream of the axial subregion with the kneading elements. This minimizes the influence of transporting elements that contribute to entrainment, and maximizes the influence of the mixing elements (kneading blocks or knurls) that do not transport (or scarcely) and have less of an entraining effect, whereby any entrainment is already kept to a small amount upstream of the molding unit.

In the production of comestibles, the feeding unit is preferably preceded by a preconditioner for moistening an initially dry loose raw material containing starch and/or protein. In this preconditioner, the raw material can be wetted as much as desired and then stay there sufficiently long for enough water to diffuse into the raw material.

The molding unit expediently has a die or a multiplicity of dies and preferably has a cutting means, in particular in the form of a rotating cutting blade or a rotating liquid jet, which follows the dies or the multiplicity of dies.

Depending on the type of articles to be produced, the molding unit may also be followed by at least one further material-working unit. This may be, for example, one or a combination of the following material-working units:
- a drying chamber, in particular a fluidized bed chamber;
- an expansion chamber;
- a flaking roller mill;
- a liquid bath, in particular a hot oil bath;
- an underwater pelletizer.

The molding unit is preferably followed by a further mixing unit for mixing up the multiplicity of articles comprising at least two different types of articles. In this case, the function of this further mixing unit may also be formed by a material-working unit with mixing characteristics, i.e. by a material-working unit with a large residence time range.

In the case of the method according to the invention, after the molding of the articles, setting of the articles is preferably performed. It is particularly advantageous if, after or during the setting of the individual articles, mixing up of the set or setting articles is performed. This may be performed, for example, in an expansion chamber or drying chamber that is formed as a fluidized bed. Because of the articles being produced continuously as different types in alternating sequence according to the invention, however, basic mixing is already obtained after the molding, so that it is also possible to work with short residence times in the further mixing device.

The method according to the invention may be used for the continuous production of articles for daily use from a polymer material, the transporting and processing of the material as a polymer melt being performed by compounding.

Alternatively, the method according to the invention may be used for the continuous production of articles for daily use from a ceramic material, the transporting and processing of the material as a ceramic paste being performed by compounding.

The method according to the invention may also be used for the continuous production of comestibles from a moistened mass of raw material containing starch and/or protein, the transporting and processing of the mass of raw material being performed by extrusion-cooking or by cold extrusion. This allows relatively strongly to virtually completely gelatinized comestibles (snacks) or relatively weakly gelatinized or virtually ungelatinized comestibles (pasta) to be produced.

The metering in of an additive is preferably performed in a sequence of metering states, the metering unit in a first metering state metering into the mass an additive with a first metered amount and the metering unit in a second metering state metering into the mass an additive with a second metered amount. In particular, the first state and the second state may follow alternately one after the other during the metering.

Preferably, a first additive and a second additive are metered in, it being the case that, in a first state, a first metered-amount mixing ratio of the first additive and the second additive is metered into the mass and, in a second state, a second metered-amount mixing ratio of the first additive and the second additive is metered into the mass. Preferably, in a third metering state, a third metered-amount mixing ratio of the first additive and the second additive is metered into the mass. In particular, in the first metering state, only a first type of additive is metered in with a first metered amount and, in the second metering state, only a second type of additive is metered in with a second metered amount. Alternatively, in the third metering state, the first type of additive and the second type of additive are simultaneously metered in with the first metered amount and with the second metered amount, respectively.

In the case of a preferred embodiment of the method according to the invention, during a respective metering state or metering cycle, the metered amount per unit of time is kept constant, the metered output having in particular the profile of a square-wave metering pulse. As a result, and preferably in combination with the measures stated further above for achieving sharp transitions of the product properties, sharp, i.e. virtually abrupt, transitions can be achieved between the continuously produced alternating sequences of different types of an article.

Stated more generally, on account of the low entrainment of the metered-in additives, the invention makes possible an almost faithful transfer of the metering rate function of the metering unit, with only little "smearing", to the time profile of the product properties of the article discharged after the molding unit.

It is therefore alternatively possible (in a contrary embodiment) for the metered amount per unit of time first to be run up and then to be run down again during a respective metering state or metering cycle, the metered output having in particular the profile of a triangular-wave metering pulse. As a result, and preferably in combination with the measures stated further above for achieving sharp transitions of the product properties when using square-wave metering pulses, blurred transitions or deliberately linearly gradual transitions can be achieved between the continuously produced alternating sequences of different types of an article.

Instead of metering rate profiles based on rectangular-wave or triangular-wave metering pulses, sinusoidal metering rate profiles may also be used.

The duration of a metering pulse or metering cycle may in principle be chosen as desired. In the case of the continuous production of comestibles from a moistened mass of raw material containing starch and/or protein, a state duration or a duration of a metering cycle of approximately 2 min to 10 min is preferably used. This ensures that, with the customary extruder sizes and the associated throughputs, subsequent mixing of the finished comestibles does not become too complex. In particular in the case of sharp rectangular-wave metering rate profiles, the state duration or the duration of a metering cycle may also be chosen between approximately 10 s and 40 s. As a result, packs with different types of comestible, such as for example packs with a colorful, rainbow-like etc. arrangement of comestibles, can be produced with the customary extruder sizes and throughputs, if the mixing of the finished comestibles is dispensed with.

The switching-over duration between different metering states is preferably approximately 0.1 s to 1 s. This ensures, preferably in combination with the measures stated further above, a sharp transition between the different types of comestibles.

In the case of the continuous production of comestibles from a moistened mass of raw material containing starch and/or protein, the following further treatment steps are performed in particular:

When the moistened mass is being transported and processed, extrusion-cooking may be performed, in particular at temperatures between 90° C. and 180° C., after which an expansion of the comestibles takes place when the mass provided with an additive is being molded into individual comestibles comprising the additive. In this way, expanded or "puffed" comestibles that are popular as snacks are obtained.

When the mass provided with an additive is being molded into individual comestibles comprising the additive, flaking of the comestibles may also be performed.

When the moistened mass is being transported and processed, cold extrusion may be performed, in particular at temperatures between 35° C. and 90° C., it being the case that, after the mass provided with an additive is molded into individual comestibles comprising an additive, drying of the comestibles is performed.

When the mass provided with an additive is being molded into individual comestibles comprising the additive, introduction of the comestibles into a liquid bath, in particular into a hot oil bath, may also be performed. In this way, deep-fried comestibles are obtained. These may also be expanded before the deep frying, as described further above.

It is particularly expedient if at least one colorant is metered as an additive. Such influencing of the color alone makes the comestible more attractive to children in particular.

At least one colorant and/or at least one flavoring is metered as at least one additive. Consequently, the visual impression of the comestible produced in this way can be combined with a taste, the metering of a colorant and the metering of a flavoring corresponding to the colorant preferably being performed synchronously, in particular in phase.

The metering of a first colorant and/or flavoring and the metering of a second colorant and/or flavoring may also be performed deliberately asynchronously, in particular in phase opposition. As a result, it is possible with relatively few types of additives, i.e. with relatively few colorants and/or relatively few flavorings, to achieve numerous colors and flavors for the individual comestibles, which are ultimately offered to the customer altogether in a well mixed-up form in a pack.

BRIEF DESCRIPTION OF DRAWINGS

Further advantages, features and application possibilities of the invention emerge from the description which now follows of an exemplary embodiment of the invention, which is not to be interpreted as restrictive, wherein.

Figure 1:
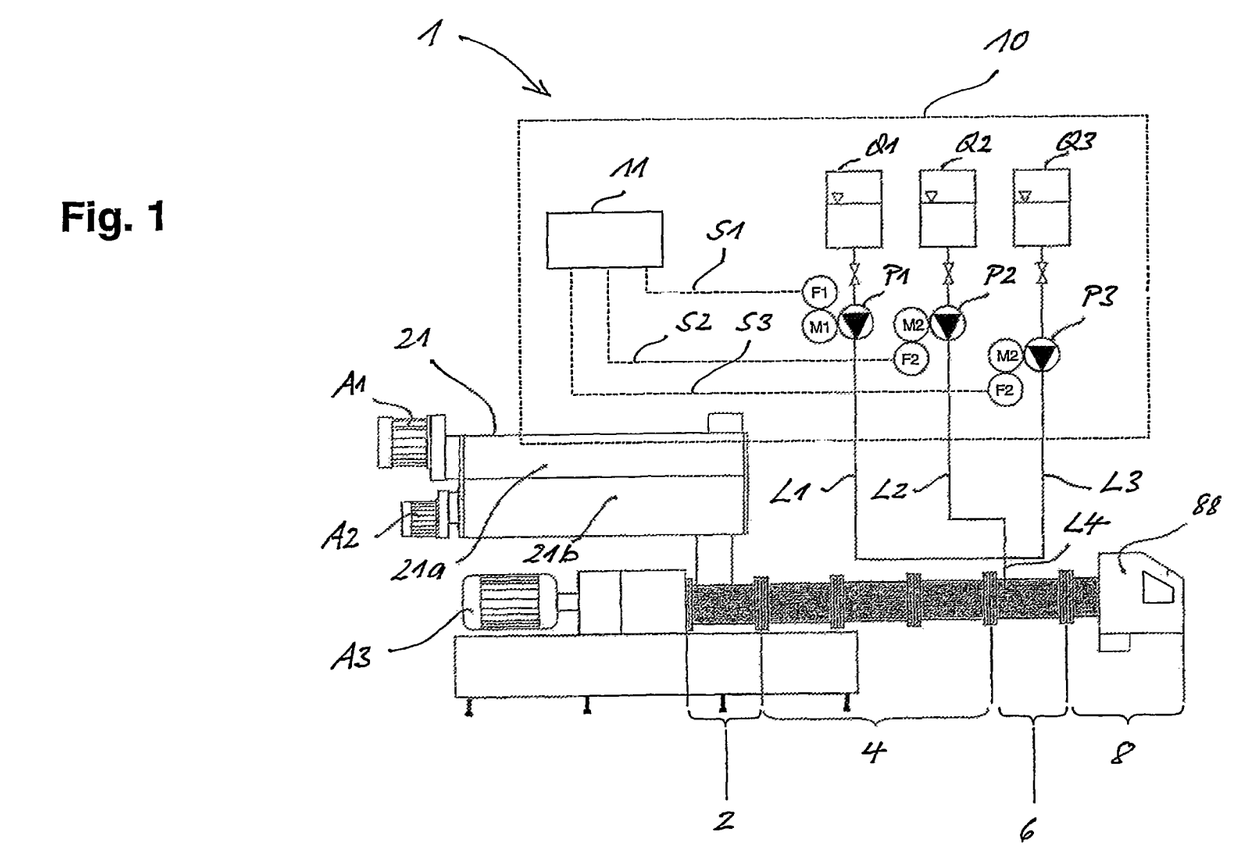
FIG. 1 shows a diagram of a device according to the invention for the production of a comestible.

Shown in FIG. 1 is a diagram of a device 1 according to the invention for continuously producing a multiplicity of articles comprising at least two different types of articles from a pasty mass, preferably for the continuous production of comestibles from a moistened mass of raw material containing starch and/or protein.

The device 1 substantially comprises a processing unit 4 with transporting elements for processing and transporting the mass, a feeding unit 2 for feeding the mass into the processing unit 4, a metering unit 10 for metering an additive into the mass transported through the processing unit (4), a mixing unit 6 with mixing elements downstream of the processing unit 4 for mixing the metered-in additive into the mass and also a molding unit 8 with molding elements downstream of the mixing unit 6 for molding the mass provided with an additive into individual articles.

The metering unit 10 is connected via a first switching unit F1, M1, P1, via a second switching unit F2, M2, P2 and via a third switching unit F3, M3, P3 respectively to a first source Q1, a second source Q2 and a third source Q3 for a respective additive. The first switching unit includes a first final control element F1, a first drive motor M1 and a first pump P1. The second switching unit includes a second final control element F2, a second drive motor M2 and a second pump P2. The third switching unit includes a third final control element F3, a third drive motor M3 and a third pump P3. The final control elements F1, F2 and F3 are activated by a central controller 11 via respective lines S1, S2 and S3 and set the speed of the respective drive motors M1, M2 and M3 on the basis of the signal preset by the controller 11 via the lines S1, S2 and S3, whereby the pumping output of the respective pumps P1, P2 and P3 is determined. The pumps P1, P2 and P3 are respectively connected to the source Q1, Q2 or Q3 for a respective additive.

Speed regulators (frequency converters) may also be used as final control elements F. Alternatively, other forms of quantitative control may also be used, such as for example control valves. However, speed regulation is preferred. A further alternative is that the actual value is sensed by a flowmeter. This makes closed-loop control of the metered amounts possible instead of simple open-loop control, in a more sophisticated embodiment.

Consequently, the speed of the respective pumps P1, P2 and P3, preset by the controller 11, is used as a basis for determining the metering rate of the respective additives from the sources Q1, Q2 and Q3, which are fed to the mixing unit 6 via the lines L1, L2 and L3 and a common line or collective line L4. Instead of the collective line L4, which opens out into the mixing unit at one point, the three lines L1, L2 and L3 may also open out separately into the mixing unit 6, the points at which these three lines open out preferably lying close together. They may then either have a short radial distance from one another or be arranged at one and the same axial position, but distributed along the circumferential direction of the mixing unit 6.

During operation, the first switching unit F1, M2, P1, the second switching unit F2, M2, P2 and the third switching unit F3, M3, P3 are switched into a respective switching state, in which the metering unit 10 meters into the mass the respective additive from the sources Q1, Q2 and Q3 at a respective metering rate.

The feeding unit 2 is preceded by a preconditioner 21, which has two chambers 21a and 21b, which are arranged in series and in which a mass of raw material containing starch and/or protein, such as for example flour or groats, is preconditioned. Contained in each of the two chambers 21a and 21b of the preconditioner 21 is at least one shaft with blade- or paddle-like implements, which is driven by a drive unit A1 or A2, respectively. The raw material only stays in the first chamber 21a for a short time, to be wetted with water (fluidizing, high-speed mixer), while the raw material wetted in this way stays in the second chamber 21b sufficiently long for the water on the surface of the particles of the raw material containing starch and/or protein to be able to diffuse into the particles.

The feeding unit 2, the processing unit 4 with transporting elements and the mixing unit 6 of the device 1 are formed by different axial regions of a twin-screw extruder 2, 4, 6, the material-working screws of which are driven by a drive unit A3. The feeding unit 2 and the processing unit 4 include transporting screw elements (not shown), while the mixing unit 6 has at least mixing elements, for example in the form of kneading blocks 65 (see FIG. 2) and/or knurls, since the mass could also be transported through the mixing unit 6 just by the transporting effect of the feeding unit 2 and the processing unit 4. However, the mixing unit 6 preferably includes both forwardly transporting and rearwardly transporting screw elements and also kneading blocks and/or knurls (see FIG. 2).

The processing unit 4 may be formed as a cold-extrusion unit, for example for the production of pasta, or as an extrusion-cooking unit, for example for the production of snacks. Correspondingly, the molding unit 8, equipped with a cutting device (not shown), may be followed by a drying unit (not shown) for drying the mass molded into pasta or an expansion unit 88 for expanding the mass extrusion-cooked into snacks.

Figure 2:
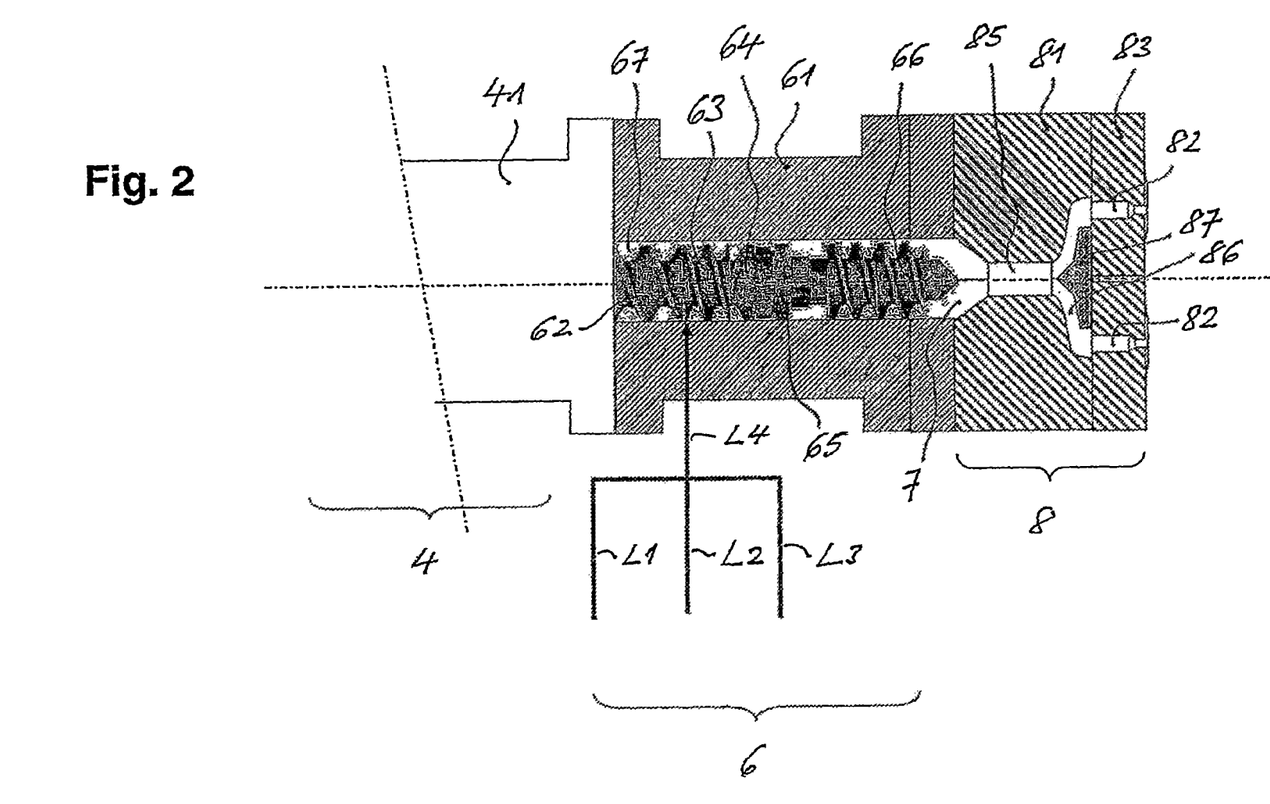
FIG. 2 shows an enlarged view, partially in a vertical section, of a portion of the device according to the invention from FIG. 1.

Shown in FIG. 2 is an enlarged view, partially represented in a vertical section, of a portion of the device 1 according to the invention from FIG. 1. The housing 41 of the processing unit 4 (see FIG. 1) is only partially indicated, while the mixing unit 6 and the molding unit 8 are represented as a view of a vertical section through one of the axes of the twin-screw extruder 2, 4, 6, one of the two mixing screws of the twin-screw extruder 2, 4, 6 being shown as a side view (not in section).

The mixing unit 6 contains in its housing 61 two material-working screws, which respectively form an axial subregion of the two screws of the twin-screw extruder 2, 4, 6. Each of the material-working screws includes, in series in the transporting direction, a region with forwardly transporting screw elements ("right-hand elements") 62, 63 with decreasing pitch, a region with rearwardly transporting screw elements 64, a region with kneading blocks 65 and a further region with forwardly transporting screw elements 66. The rearwardly transporting screw elements ("left-hand elements") 64 have the effect of producing in the mixing chamber 67, as a result of the mass that is built up in this region during its transport, a sealing with respect to the processing chamber of the processing unit 4. In particular, however, the left-hand element also contributes to increasing the mixing intensity.

The molding unit 8 does not contain any movable parts in its housing 81. Instead, it is formed without any dead volume, in order to minimize any entrainment of parts of the mass and of the additives metered into it. The transition 7 between the mixing chamber 67 of the mixing unit 6 and the cavity 85 extending over an axial subregion of the molding unit 8 is formed without sharp edges, burrs or ridges on its inner surface, formations of this type being quantifiable as regions with a small radius of curvature. The cavity 85 is followed downstream by a ring-like cavity 86, which extends between the housing 81 and a tapered core 87 and, further downstream, finally opens out into a multiplicity of dies 82, which are provided in a die plate 83 fastened to the housing 81. Arranged outside the die plate 83 is a cutting unit, for example in the form of rotating blades, to cut the strands of mass emerging through the dies 82 into small particles, which are then dried in a dryer (not shown) or expanded in the expansion unit 88.

The metering of additives from the sources Q1, Q2 and Q3 (see FIG. 1) is performed via the lines L1, L2 and L3, which join together to form a common line L4. This common line L4 opens out through the housing 61 of the mixing unit 6 into the mixing chamber 67 upstream of the mixing elements or the kneading blocks 65 of the material-working screw.

The metering unit 10 (see FIG. 1) is consequently connected via the line L4 in an axial subregion of the mixing unit 6 that lies upstream of the axial subregion with the kneading elements 65.

Figure 3:
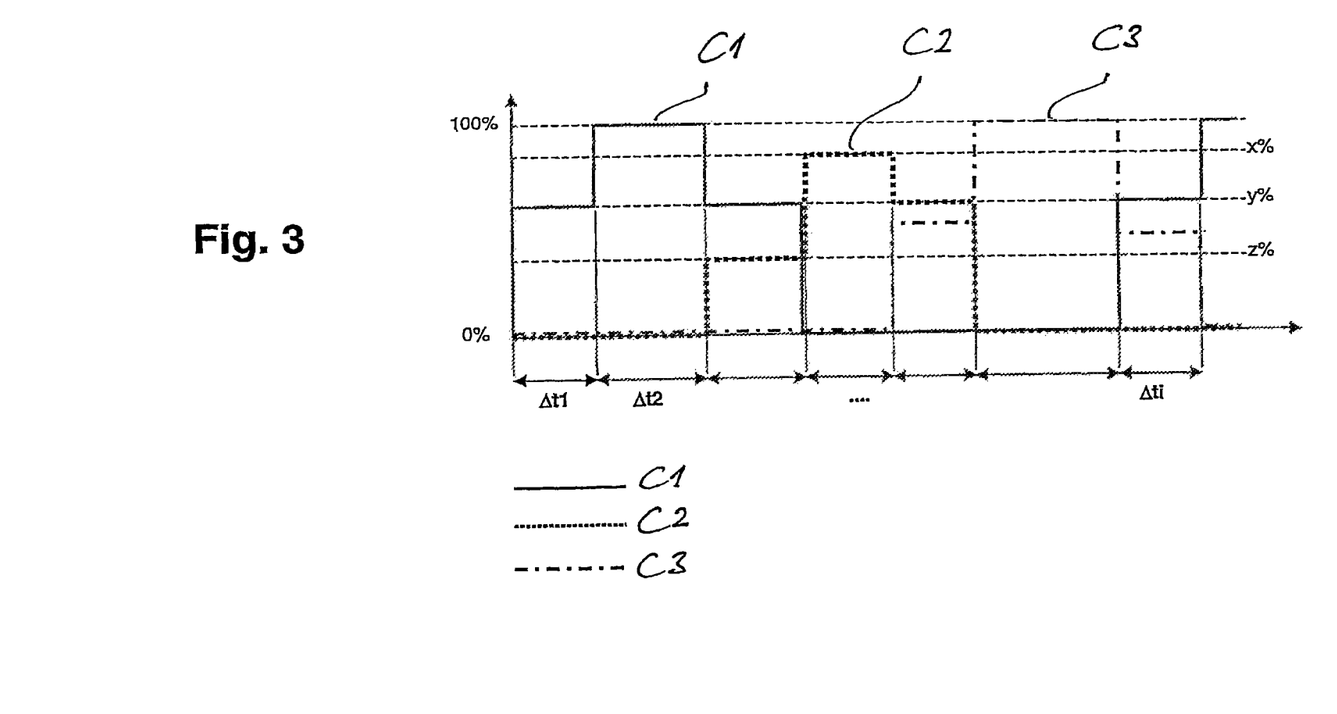
FIG. 3 shows a time-based metering profile of additives in the case of a method according to the invention.

Shown in FIG. 3 is a time-based metering profile for the metering of three different additives. Three different colors are metered here as additives, the color C1 being metered via the line L1, the color C2 being metered via the line L2 and the color C3 being metered via the line L3. The time-based metering rate profile of the colors C1, C2 and C3 is shown as a solid line, as a dotted line and as a dash-dotted line, respectively. The adding of the respective colors C1, C2 and C3 is performed sequentially and is in each case constant during preset time intervals $\Delta t_i$. The metering rates used here are the maximum (maximum value, 100%), an intermediate value (100%>x %>y %>z %) or zero (minimum value, 0%). By suitable combinations of colors and combinations of metering rates, specific colorations of the mass can be achieved at each point in time t. By using suitable basic colors for the additive color mixing, virtually all colors and shades of color can be set by suitable mixing ratios. By very short switching-over durations of about 0.1 s to 0.3 s and residence times $\Delta t_i$ from several 10 s to several minutes with a respectively constant metering rate, square-wave metering pulses are produced. This has the consequence that sharp transitions are produced at the transitions from a first metering state (first mixing state) to a next metering state (next mixing state). This has the consequence that most by far of the articles for daily use or comestibles that are colored in this way are given the same coloring, attributable to the constant metering rates during the time intervals $\Delta t_i$. Only very few of the colored articles for daily use or comestibles take on an intermediate or transitional coloring.

What is claimed is:

1. A method for continuously producing a multiplicity of articles comprising at least two different types of articles from a pasty mass, using a device for continuously producing a multiplicity of articles, the device comprising:
   a screw extruder comprising axial regions comprising:
      a feeding unit;
      a processing unit with transporting elements for processing and transporting the mass; and
      a mixing unit with mixing elements downstream of the processing unit;
   a metering unit connected by means of at least one switching unit to at least one source of a respective additive, wherein the or each respective switching unit is configured to be switched into a respective switching state; and
   a molding unit, provided after the processing unit, with molding elements downstream of the mixing unit, for molding the mass provided with at least one of said additives into individual articles;
   the method having the following steps:
   feeding the mass by the feeding unit into the processing unit;
   transporting and processing the mass through the processing unit;
   metering at least one of said additives by the metering unit into the mass transported through the processing unit;
   mixing said at least one metered-in additive into the mass by the mixing unit;
   molding the mass provided with said at least one additive into individual articles by the molding unit;
   wherein the metering in of said at least one additive takes place in a sequence of metering states comprising at least two different metering states, wherein the metering unit in a respective metering state meters at least one respective additive of said at least one additive into the mass at a respective metering rate;
   wherein a duration of the metering state or a duration of a metering cycle is less than approximately 40 seconds;
   wherein a switching over duration between different metering states is approximately 0.1 s to 1 s.

2. The method as claimed in claim 1, wherein, after the molding of the articles, setting of the articles is performed.

3. The method as claimed in claim 2, wherein, after or during the setting of the individual articles, mixing up of the set or setting articles is performed.

4. The method as claimed in claim 1 for the continuous production of comestibles from a moistened mass of raw material containing starch and/or protein.

5. The method as claimed in claim 1 for the continuous production of comestibles from a moistened mass or raw material containing starch and/or protein, characterized in that the transporting and processing of the mass of raw material is performed by cold extrusion.

6. The method as claimed in claim 1, wherein in a first metering state, the metering unit meters a first metered amount of the respective additive(s) into the mass and in a second metering state, the metering unit meters a second metered amount of the respective additive(s) into the mass.

7. The method as claimed in claim 6, wherein a first of the at least two different metering states and a second of the at least two different metering states follow alternately one after the other during the metering.

8. The method as claimed in claim 6, wherein a first additive and a second additive are metered in and in the first metering state, a first metered-amount mixing ratio of the first additive and the second additive is metered into the mass and, in the second metering state, a second metered-amount mixing ratio of the first additive and the second additive is metered into the mass.

9. The method as claimed in claim 8, wherein, in a third metering state, a third metered-amount mixing ratio of the first additive and the second additive is metered into the mass.

10. The method as claimed in claim 6, wherein in the first metering state, only a first type of additive is metered in with the first metered amount.

11. The method as claimed in claim 10, wherein in the second metering state, only a second type of additive is metered in with the second metered amount.

12. The method as claimed in claim 9, wherein, in the third metering state, the first type of additive and the second type of additive are simultaneously metered in with the first metered amount and with the second metered amount, respectively.

13. The method as claimed in claim 1, wherein during a respective metering state or metering cycle, a metered amount per unit of time is kept constant.

14. The method as claimed in claim 1, wherein a metered amount per unit of time is first run up and then run down again during a respective metering state or metering cycle.

15. The method as claimed in claim 4, wherein, when the moistened mass is being transported and processed, extrusion-cooking is performed, and wherein an expansion of the comestibles takes place when the mass provided with an additive is being molded into individual comestibles comprising the additive.

16. The method as claimed in claim 4, wherein, when the mass provided with an additive is being molded into individual comestibles comprising the additive, flaking of the comestibles is performed.

17. The method as claimed in claim 4, wherein, when the moistened mass is being transported and processed, cold extrusion is performed, and in that, after the mass provided with an additive is molded into individual comestibles comprising an additive, drying of the comestibles is performed.

18. The method as claimed in claim 4, wherein, when the mass provided with an additive is being molded into individual comestibles comprising the additive, introduction of the comestibles into a liquid bath is performed.

19. The method as claimed in claim 1, wherein at least one colorant is metered as an additive.

20. The method as claimed in claim 4, wherein at least one colorant and/or at least one flavoring is metered as an additive.

21. The method as claimed in claim 20, wherein a metering of a colorant and a metering of a flavoring corresponding to the colorant are performed synchronously.

22. The method as claimed in claim 20, wherein a metering of a first colorant and/or flavoring and a metering of a second colorant and/or flavoring are performed asynchronously.

23. The method as claimed in claim 18, wherein the liquid bath is a hot oil bath.

24. The method as claimed in claim 21, wherein the metering of a colorant and the metering of a flavoring corresponding to the colorant are performed synchronously in phase.

25. The method as claimed in claim 22, wherein the metering of a first colorant and/or flavoring and the metering of a second colorant and/or flavoring are performed asynchronously in phase opposition.

26. The method as claimed in claim 1, wherein the device contains several sources of respective additives and the respective additives are fed to the mixing unit via respective lines which open out separately into the mixing unit.

27. The method as claimed in claim 26, wherein the respective lines each engage the mixing unit at a point together forming a plurality of points, and the points at which the respective lines open out into the mixing unit have a short radial distance from one another.

28. The method as claimed in claim 26, wherein the respective lines each engage the mixing unit at a point, together forming a plurality of points, and the points at which the lines open out into the mixing unit are distributed along a circumferential direction of the mixing unit.

\* \* \* \* \*